United States Patent
Celik et al.

(10) Patent No.: US 12,408,131 B2
(45) Date of Patent: Sep. 2, 2025

(54) NETWORK NODE, DEVICE TO DEVICE USER EQUIPMENT, AND METHODS IN A RADIO COMMUNICATIONS NETWORK

(71) Applicant: Telefonaktiebolaget LM Ericsson (publ), Stockholm (SE)

(72) Inventors: Haris Celik, Stockholm (SE); Muhammad Kazmi, Sundbyberg (SE); Santhan Thangarasa, Vällingby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 253 days.

(21) Appl. No.: 17/911,286

(22) PCT Filed: Mar. 31, 2020

(86) PCT No.: PCT/SE2020/050330
§ 371 (c)(1),
(2) Date: Sep. 13, 2022

(87) PCT Pub. No.: WO2021/201731
PCT Pub. Date: Oct. 7, 2021

(65) Prior Publication Data
US 2023/0113017 A1   Apr. 13, 2023

(51) Int. Cl.
*H04W 56/00* (2009.01)
*H04L 27/26* (2006.01)

(52) U.S. Cl.
CPC ....... *H04W 56/004* (2013.01); *H04L 27/2605* (2013.01)

(58) Field of Classification Search
CPC ....... H04L 5/14; H04L 5/0048; H04L 5/0044; H04L 5/1469; H04L 43/10; H04L 43/16;
(Continued)

(56) References Cited

U.S. PATENT DOCUMENTS 11,968,641 B2 * 4/2024 Kim .................. H04W 56/00
11,979,842 B2 * 5/2024 Palenius ................. H04L 5/14
(Continued)

FOREIGN PATENT DOCUMENTS

GB    2499803 A    9/2013
WO    2012034269 A1    3/2012
(Continued)

OTHER PUBLICATIONS

International Search Report and Written Opinion dated Jan. 13, 2021 for International Application No. PCT/SE2020/050330 filed Mar. 31, 2020; consisting of 12 pages.
(Continued)

*Primary Examiner* — Jung Liu
(74) *Attorney, Agent, or Firm* — Weisberg I.P. Law, P.A.

(57) ABSTRACT

A method performed by a Network Node (NN) for handling Device to Device (D2D) operation between a first D2D User Equipment (UE) and a second D2D UE in a radio communications network is provided. The NN obtains data related to propagation delay in one or more cells served by the NN. The propagation delay is related to any one or more out of: the first D2D UE, the second D2D UE, other D2D UEs, and cellular UEs. The NN then determines whether or not to configure a number of Guard Period (GP) symbols within a switching time resource, as Sidelink (SL) radio resources for the D2D operation. The determining is based on one or more criteria applied to the obtained data related to the propagation delay.

18 Claims, 12 Drawing Sheets

---

301. Receive request for configuring a number of GP symbols within a switching time resource, as SL radio resources for D2D operation.

302. Obtain data related to propagation delay in one or more cells served by the NN.

303. Determine whether or not to configure a number of GP symbols within a switching time resource, as Sidelink radio resources for D2D operation based on one or more criteria applied to the obtained data.

304. Send to first D2D UE and/or second D2D UE, configuration relating to the determined number of GP symbols within the switching time resource to be configured as SL radio resources for said D2D operation.

(58) Field of Classification Search
CPC ..... H04L 5/0053; H04L 5/0094; H04L 41/08; H04L 43/0858; H04W 72/0446; H04W 72/0453; H04W 72/20; H04W 76/14; H04W 72/54; H04W 72/12; H04W 24/08
See application file for complete search history.

(56) References Cited

U.S. PATENT DOCUMENTS

| | | | | |
|---|---|---|---|---|
| 12,088,532 | B2* | 9/2024 | Kim | H04L 1/1854 |
| 2018/0279325 | A1* | 9/2018 | Huang | H04W 72/54 |
| 2019/0349972 | A1* | 11/2019 | Nam | H01Q 1/243 |
| 2020/0314912 | A1* | 10/2020 | Wang | H04W 16/28 |
| 2020/0367187 | A1* | 11/2020 | Palenius | H04L 5/14 |
| 2021/0329633 | A1* | 10/2021 | Xing | H04L 5/14 |
| 2022/0159596 | A1* | 5/2022 | Kim | H04J 11/00 |

FOREIGN PATENT DOCUMENTS

| | | |
|---|---|---|
| WO | 2012048464 A1 | 4/2012 |
| WO | 2014023001 A1 | 2/2014 |
| WO | 2014023847 A1 | 2/2014 |
| WO | 2015171032 A1 | 11/2015 |
| WO | 2016137384 A1 | 9/2016 |
| WO | 2016193840 A1 | 12/2016 |

OTHER PUBLICATIONS

3GPP TS 36.211 V15.6.0; 3rd Generation Partnership Project; Technical Specification Group Radio Access Network; Evolved Universal Terrestrial Radio Access (E-UTRA); Physical channels and modulation (Release 15); Jun. 2019; consisting of 245 pages.
3GPP TS 36.211 V16.0.0; 3rd Generation Partnership Project; Technical Specification Group Radio Access Network; Evolved Universal Terrestrial Radio Access (E-UTRA); Physical channels and modulation (Release 16); Dec. 2019; consisting of 246 pages.
3GPP TS 36.300 V15.6.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15); Jun. 2019; consisting of 365 pages.
3GPP TS 38.213 V15.6.0; 3rd Generation Partnership Project; Technical Specification Group Radio Access Network; NR; Physical layer procedures for control (Release 15); Jun. 2019; consisting of 107 pages.

* cited by examiner

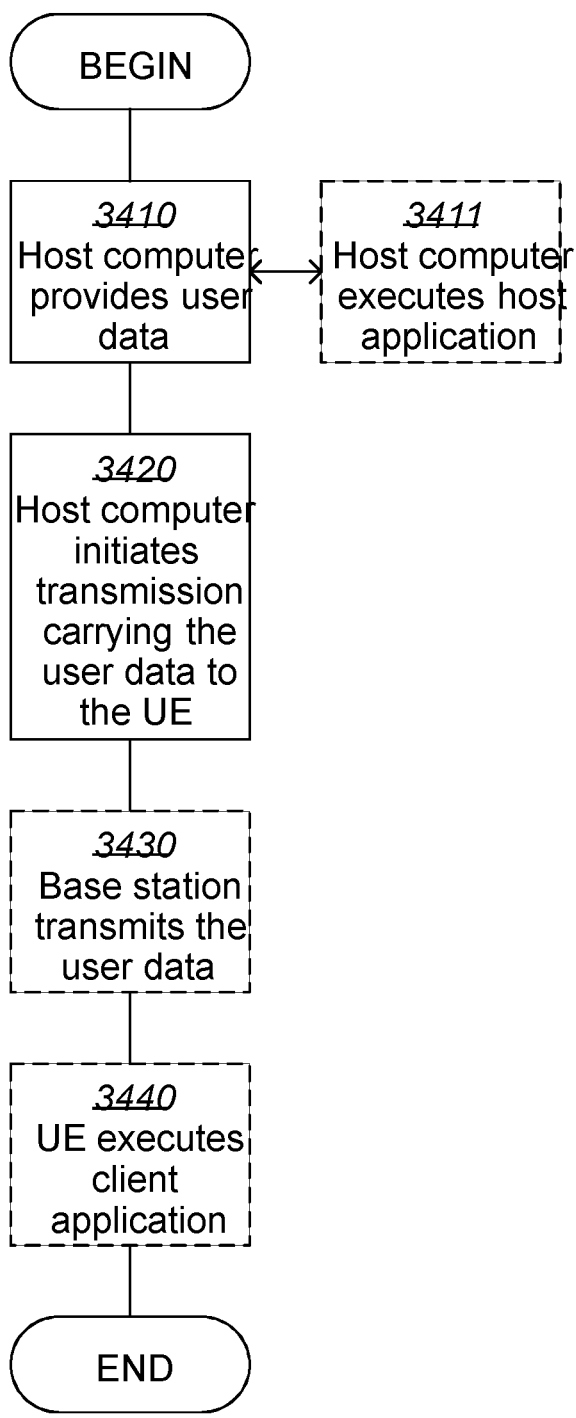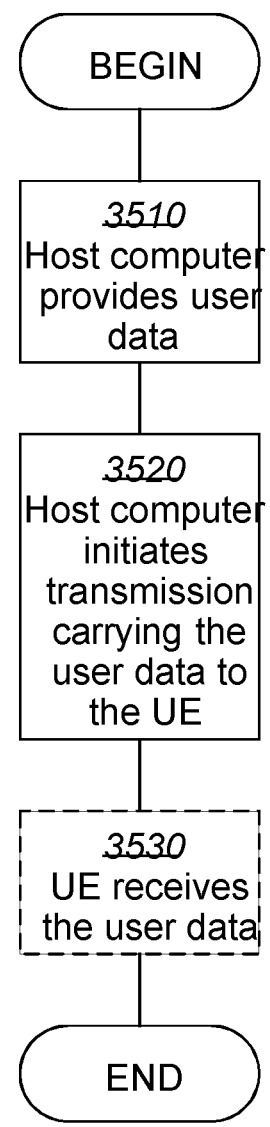
FIG. 11
FIG. 12

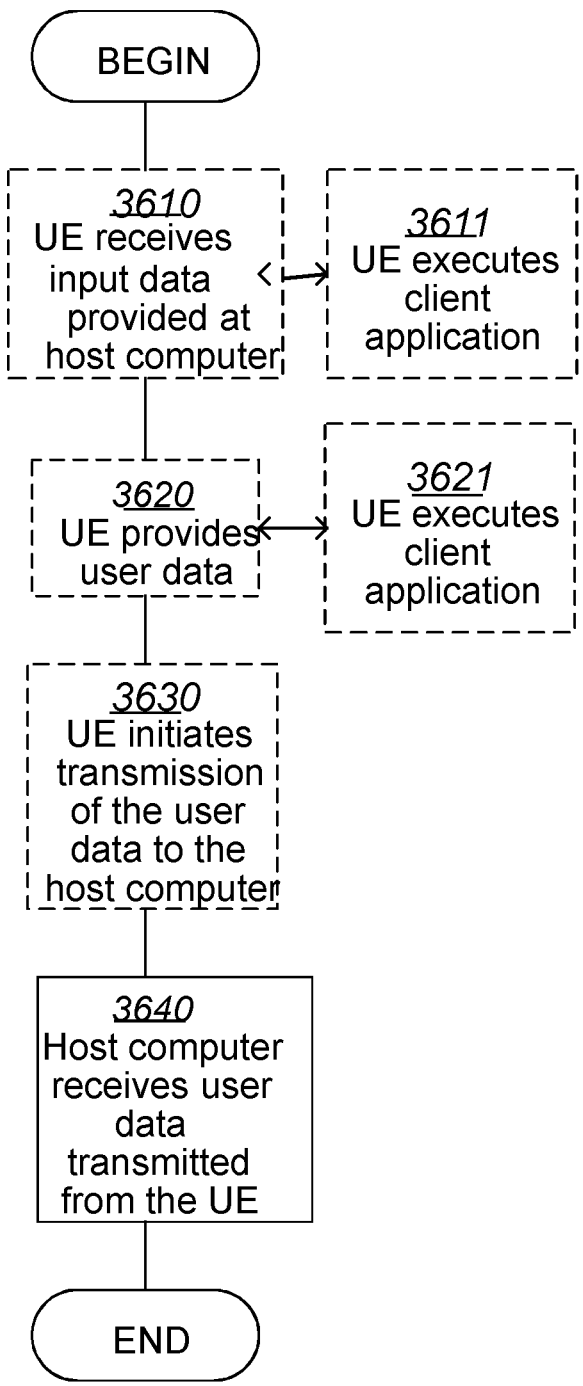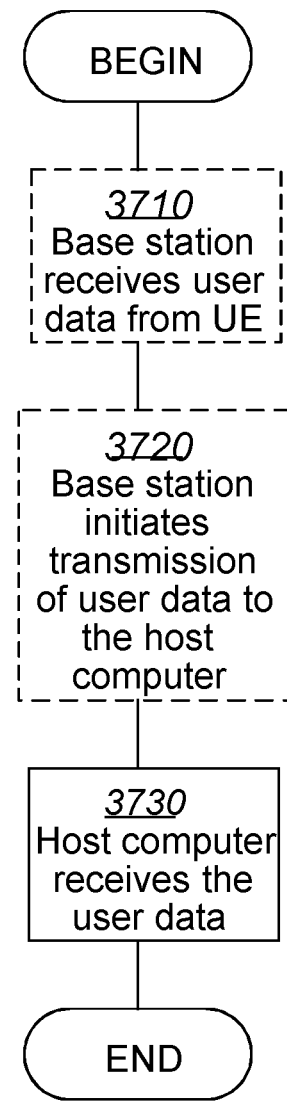
FIG. 13
FIG. 14

NETWORK NODE, DEVICE TO DEVICE USER EQUIPMENT, AND METHODS IN A RADIO COMMUNICATIONS NETWORK

CROSS-REFERENCE TO RELATED APPLICATIONS

This application is a Submission Under 35 U.S.C. § 371 for U.S. National Stage Patent Application of International Application Number: PCT/SE2020/050330, filed Mar. 31, 2020, entitled "NETWORK NODE, DEVICE TO DEVICE USER EQUIPMENT, AND METHODS IN A RADIO COMMUNICATIONS NETWORK," the entirety of which is incorporated herein by reference.

TECHNICAL FIELD

Embodiments herein relate to network nodes, a Network Node (NN), and a first Device to Device (D2D) User Equipment (UE), and methods therein. In particular they relate to for handling D2D operation between the first D2D UE and a second D2D UE in a radio communications network.

BACKGROUND

In a typical radio communication network, user equipments (UEs), also known as wireless communication devices, mobile stations, stations (STA) and/or wireless devices, communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio access node such as a radio access node e.g., a Wi-Fi access point or a radio base station (RBS), which in some networks may also be denoted, for example, Network Node (NN), radio network node, NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) or new generation, (NG or ng). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Guard Period in TDD Cellular Networks

Cellular networks, also referred to as radio communications networks, are made up of Network Nodes (NNs) to which UEs associate to receive or send information over the air. The NN is said to be in uplink (UL) if it is receiving from a UE, and in downlink (DL) if it is transmitting to a UE. On the other end, the UE is said to be in UL if it is transmitting to the NN, and in DL if it is receiving from the NN. If the cellular network operates time division duplexing (TDD), then UL and DL transmissions share the same bandwidth but are separated in time domain to avoid DL and UL from interfering each other. Especially DL-to-UL interference may severely limit UL performance due to the often much stronger transmission power of NNs. Therefore, TDD cellular networks typically employ the same TDD pattern in all cells and a Guard Period (GP) when switching from DL to UL. The GP needs to be large enough to account for the propagation delay of the DL transmissions including channel delay spread, as well as the DL-to-UL switching time for the hardware circuitry. Furthermore, if Orthogonal Frequency Division Multiple Access (OFDMA) is used as multiple access method for UL, the cellular UE transmissions need to arrive aligned in time at the NN within one cyclic prefix to preserve orthogonality between subcarriers received from different UEs. To ensure this, each UE will transmit based on a timing alignment corresponding to its propagation delay to its serving NN. The total GP should therefore be at least 2PT+ST, where PT denotes the propagation delay between the UE and its serving NN, and ST refers to the switching time, as illustrated in FIG. 1. FIG. 1 depicts the GP when switching from DL to UL.

UL-DL Configurations in TDD

LTE TDD

3GPP Evolved Universal Terrestrial Radio Access (E-UTRA); Physical channels and modulation (Release 15)," 3GPP TS 36.211, V15.6.0, 2019 supports three types of frame structures depending on operation: Type 1 applicable to FDD, type 2 applicable to TDD, and type 3 applicable to Licensed Assisted Access (LAA) secondary cell operation.

In frame structure type 2 designed for TDD a radio frame is 10 ms long and consists of two half-frames. Each half-frame is 5 ms long and consists of 5 subframes, each 1 ms long. In LTE TDD all the symbols in a subframe are allocated to either UL or DL. The supported UL-DL configurations are listed in Table 1 below, where "D" indicates a subframe reserved for DL transmissions, "U" corresponds to a subframe reserved for UL transmissions, and "S" is a special subframe where the DL-to-UL switching occurs. Special subframes consist of three parts: a DL part (DwPTS) used for DL data transmissions; a GP to account for propagation delay and switching time; and an UL part (UpPTS) for random access or channel sounding. Table 1 shows UL-DL configurations for LTE TDD and refers to 3GPP TS 36.211, V15.6.0, 2019 Table 4.2-2.

TABLE 1

| UL-DL configuration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The supported special subframe configurations are shown in Table 2 below, where X represents the number of additional symbols that can be configured for channel sounding enhancement in terms of the Sounding Reference Signal (SRS). The UpPTS is not used for data transmission due to its very short duration for special subframe configurations 0-9. However, the introduction of special subframe configuration 10 in LTE Release 14 enables UpPTS to be used also for UL data transmission for this particular configuration.

Table 2 shows Supported special subframe configurations of and refers to 3GPP TS 36.211, V16.0.0, 2019.

TABLE 2

| Special subframe configuration | Normal CP for DL and UL | | | Extended CP for DL and UL | | |
|---|---|---|---|---|---|---|
| | DwPTS | GP | UpPTS | DwPTS | GP | UpPTS |
| 0 | 3 | 10 − X | 1 + X | 3 | 8 − X | 1 + X |
| 1 | 9 | 4 − X | 1 + X | 9 | 2 − X | 1 + X |
| 2 | 10 | 3 − X | 1 + X | 10 | 1 − X | 1 + X |
| 3 | 11 | 2 − X | 1 + X | 11 | 0 − X | 1 + X |
| 4 | 12 | 1 − X | 1 + X | 3 | 7 − X | 2 + X |
| 5 | 3 | 9 − X | 2 + X | 9 | 1 − X | 2 + X |
| 6 | 9 | 3 − X | 2 + X | 10 | 0 − X | 2 + X |
| 7 | 10 | 2 − X | 2 + X | 5 | 5 − X | 2 + X |
| 8 | 11 | 1 − X | 2 + X | | | |
| 9 | 6 | 6 − X | 2 + X | | | |
| 10 | 6 | 2 | 6 | | | |

The UL-DL and special subframe configuration is typically signaled in System Information Block 1 (SIB1) and broadcasted every 80 ms in subframe 5. To better cope with time varying traffic on a much shorter timescale, enhanced Interference Mitigation and Traffic Adaption (eIMTA) was introduced in LTE Release 12 to allow for the UL-DL configuration to be reconfigured on a per-frame basis, i.e., every 10 ms. DL subframes signaled in SIB1 will remain unchanged, whereas a subset of UL subframes and special subframes may be reconfigured to DL subframes, see E-UTRA and E-UTRAN; Overall description; Stage 2 (Release 16)," 3GPP TS 36.300, V16.0.0, 2019. The eIMTA frame structure is shown in Table 3, where "F" indicates a flexible subframe that may be reconfigured to either UL or DL depending on which TDD pattern in Table 1 that is selected. Table 3: shows eIMTA-based flexible TDD.

TABLE 3

| Subframe number | | | | | | | | | |
|---|---|---|---|---|---|---|---|---|---|
| 0 | 1 | 2 | 3 | 4 | 5 | 6 | 7 | 8 | 9 |
| D | S | U | F | F | D | D or S | F | F | F |

Compared to LTE, NR supports a more flexible TDD operation by enabling UL and DL to be determined at the symbol level for one or multiple slots. The slot formats are shown in Table 4 below.

Both LTE and NR also support semi-statically configured TDD configurations which divides symbols in the radio frame into three parts: a DL part with symbols allocated to DL only; a number of flexible symbols and symbols reserved for GP; and a remaining UL part with symbols allocated to UL only. Semi-static TDD is therefore considered more suitable in mitigating the effects of cross-link interference by avoiding it altogether for a number of UL and DL symbols. Table 4 shows Slot formats for normal cyclic prefix relating to NR; Physical layer procedures for control (Release 16)," 3GPP TS 38.213, V16.0.0, 2019, Table 11.1.1-1.

TABLE 4

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | F | F | U | U | U | U | U | U | U |
| 46 | D | D | D | D | F | U | D | D | D | D | F | U | U | U |
| 47 | D | D | F | U | U | U | U | D | D | F | U | U | U | U |
| 48 | D | F | U | U | U | U | D | F | U | U | U | U | U | U |
| 49 | D | D | D | D | F | U | U | D | D | D | D | F | U | U |
| 50 | D | D | F | F | U | U | U | D | D | F | F | U | U | U |

TABLE 4-continued

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | | | | | | | Reserved | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

D2D Operation

The D2D operation is a generic term which may comprise transmission and/or reception of any type of D2D signals, e.g. physical signals, physical channel etc., by a D2D communication capable UE, and/or by D2D discovery capable UE, referred to herein as D2D UE. D2D operation is therefore also called D2D transmission, D2D reception, D2D communication, Proximity Services (ProSe), V2X etc. V2X is a special type of D2D operation. In D2D operation the communication between any pair of D2D devices take place directly with respect to each other over the radio interface.

D2D operation takes place on radio resources on Sidelink (SL). The SL may be configured on a dedicated carrier, e.g. in a carrier of an Intelligent Transport System (ITS) band, or a carrier of the serving cell of the UE. In the latter case the SL resources and resources for cellular communication over Uu link, i.e. the link between the radio access node and the UE, are shared in time and/or frequency. Typically, the SL resources are time multiplexed with the UL resources used for cellular communication on the serving cell of the UE.

In OFDMA, UE transmissions need to arrive time aligned at the NN, e.g. serving base station. The GP used in a switching slot or subframe in large cells may be quite large, e.g. up to 12 symbols in NR. These GP symbols are unused and lead to wastage of resources.

SUMMARY

An object of embodiments herein is to improve the performance of a wireless communications network using GPs.

According to an aspect of embodiments herein, the object is achieved by a method performed by a Network Node, NN, for handling D2D operation between a first Device to Device, D2D, User Equipment, UE, and a second D2D UE in a radio communications network. The NN obtains data related to propagation delay in one or more cells served by the NN. The propagation delay is related to any one or more out of: the first D2D UE, the second D2D UE, other D2D UEs, and cellular UEs. The NN then determines whether or not to configure a number of Guard Period, GP, symbols within a switching time resource, as Sidelink, SL, radio resources for said D2D operation. The determining is based on one or more criteria applied to the obtained data related to the propagation delay.

According to a further aspect of embodiments herein, the object is achieved by a method performed by a first Device to Device, D2D, User Equipment, UE, for handling D2D operation between the first D2D UE and a second D2D UE in a radio communications network. The first D2D UE is served by a Network Node, NN. The first D2D UE obtains a configuration. The configuration configures the first D2D UE with a number of Guard Period, GP, symbols within a switching time resource, to operate as Sidelink, SL, radio resources for said D2D operation. The number of GP symbols is based on one or more criteria applied to propagation delay in one or more cells served by the NN. The propagation delay is related to any one or more out of: the first D2D UE, the second D2D UE, other D2D UEs, and cellular UEs.

According to a further aspect of embodiments herein, the object is achieved by a Network Node, NN, configured to handling Device to Device, D2D, operation between a first D2D User Equipment, UE, and a second D2D UE in a radio communications network. The NN is further being configured to:

Obtain data related to propagation delay in one or more cells served by the NN, which propagation delay is adapted to be related to any one or more out of: the first D2D UE, the second D2D UE, other D2D UEs, and cellular UEs, and determine whether or not to configure a number of Guard Period, GP, symbols within a switching time resource, as Sidelink, SL, radio resources for said D2D operation, which determining is adapted to be based on one or more criteria applied to the obtained data related to the propagation delay.

According to a further aspect of embodiments herein, the object is achieved by a first Device to Device, D2D, User Equipment, UE, configured to handling D2D operation between the first D2D UE and a second D2D UE in a radio communications network. The first D2D UE is served by a Network Node, NN. The first D2D UE is configured to obtain a configuration. The configuration is adapted to configure the first D2D UE with a number of Guard Period, GP, symbols within a switching time resource, to operate as Sidelink, SL, radio resources for said D2D operation. The number of GP symbols is adapted to be based on one or more criteria applied to propagation delay in one or more cells served by the NN, and which propagation delay is adapted to be related to any one or more out of: the first D2D UE, the second D2D UE, other D2D UEs, and cellular UEs.

Thanks to that the NN determines whether or not to configure a number of GP symbols within a switching time resource, as SL radio resources for the D2D operation based on one or more criteria applied to the obtained data related to the propagation delay, unused GP symbols leading to wastage of resources are depressed. This in turn, improves the performance of a wireless communications network using GPs.

Some advances with embodiments herein e.g. comprise as follows: The radio resources are efficiently used since unused GP symbols are used for the SL operation.

The performance of SL operation is enhanced since more resources may be configured for the SL operation without impacting the cellular communication.

In TDD there is limited capacity for SL operation which is shared with UL resources. Embodiments herein particularly improves performance in TDD systems.

BRIEF DESCRIPTION OF THE DRAWINGS

FIGS. 11-14 are flowcharts illustrating methods implemented in a communication system including a host computer, a base station and a user equipment.

DETAILED DESCRIPTION

As a part of developing embodiments herein the inventors identified a problem which first will be discussed.

Figure 1:
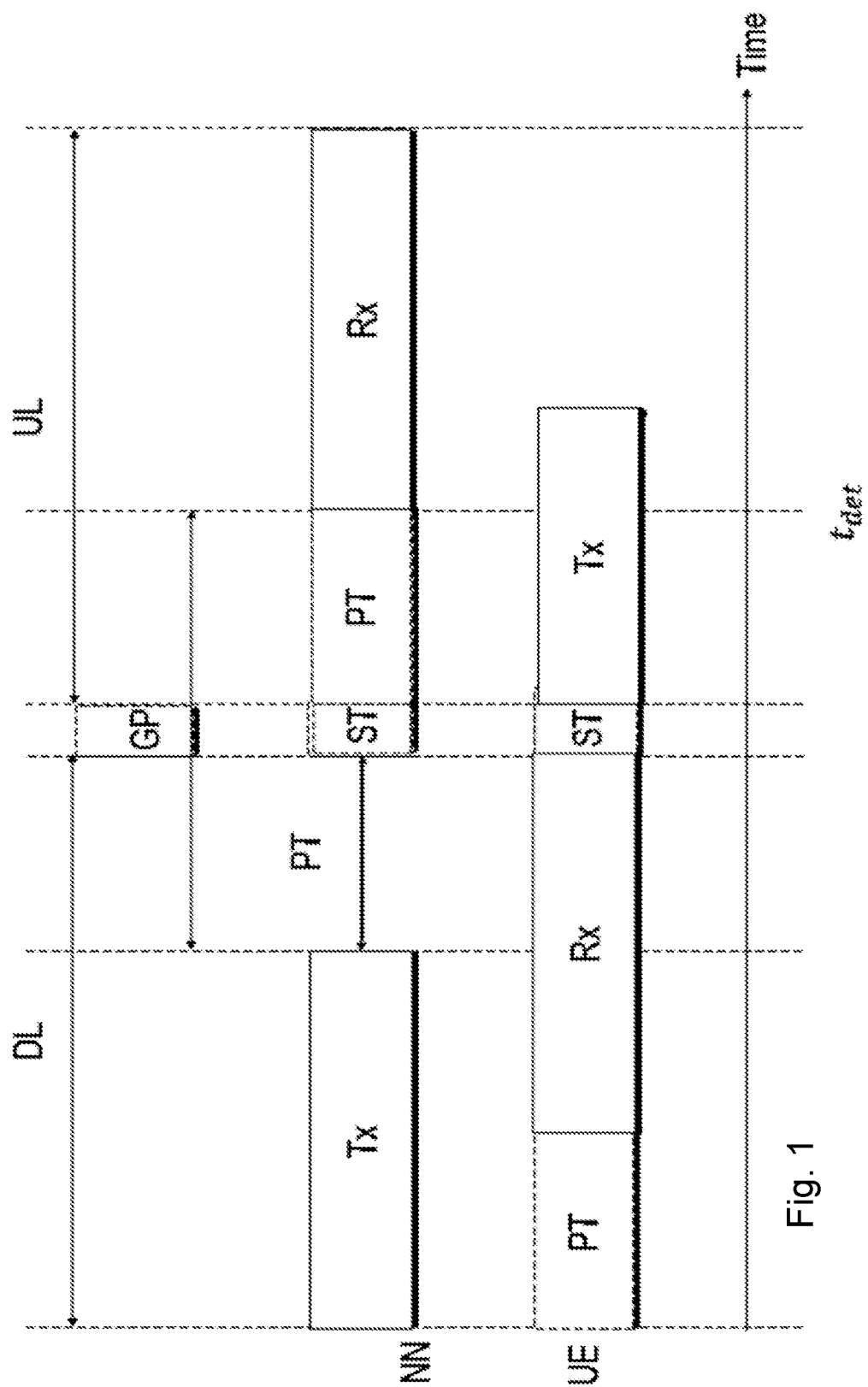
FIG. 1 is a schematic block diagram illustrating prior art.

As mentioned above, in OFDMA, UE transmissions need to arrive time aligned at the NN, e.g. serving base station. The GP used in a switching slot or subframe in large cells may be quite large, e.g. up to 12 symbols in NR. These GP symbols are unused, and therefore are sent empty. This consequently lead to wastage of resources. For example, the detection of cellular UE transmissions at the base station does not start until any one out of:

$t_{det}$, where $t_{det}$ is defined in FIG. 1, or

UpPTS in LTE special subframe, or

UL in NR switching slots, due to the UL propagation delay.

In one example propagation delay between a UE, e.g. D2D UE or cellular UE, and a Network Node (NN) may be obtained by the NN autonomously and/or based on information, e.g. measurement, received from the UE. In the former case, the NN may estimate or measure a Round Trip Time (RTT) of signals transmitted between NN and the UE. In the latter case the UE may estimate or measure RTT of signals transmitted between the NN and the UE, and transmit the results to the NN. The one way propagation delay is a function of RTT e.g. one half of the RTT. An example of RTT measurement performed by the NN is NN Rx-Tx time difference; where Rx is the reception time of signal received at the NN from the UE in a time resource #i and Tx is the transmission time of signal transmitted by the NN in a time resource #j, which is closest in time with respect to resource #i. An example of RTT measurement performed by the UE is UE Rx-Tx time difference; where Rx is the reception time of signal received at the UE from the NN in a time resource #p and Tx is the transmission time of signal transmitted by the UE in a time resource #q, which is closest in time with respect to resource #p. Examples of time resources are symbols, slots, subframes, frames etc.

The propagation delay may be determined by RTT measurement. The propagation delay is function of RTT. In one example the propagation delay is one half of the RTT. The propagation delay is also interchangeably called as one way propagation delay. The one way propagation delay refers to the time required by a signal to propagate or travel between a UE and a network node e.g. from the UE to the network node or from the network node to the UE. For example, if the RTT measured value is 2 µs, then one way propagation delay is assumed to be 1 µs.

Embodiments herein provide a method to use at least a subset of the GP symbols as SL radio resources for D2D operation, while taking into account the propagation delay. Some embodiments herein relate to Guard Period Based Sidelink Communication in TDD Networks.

Figure 2:
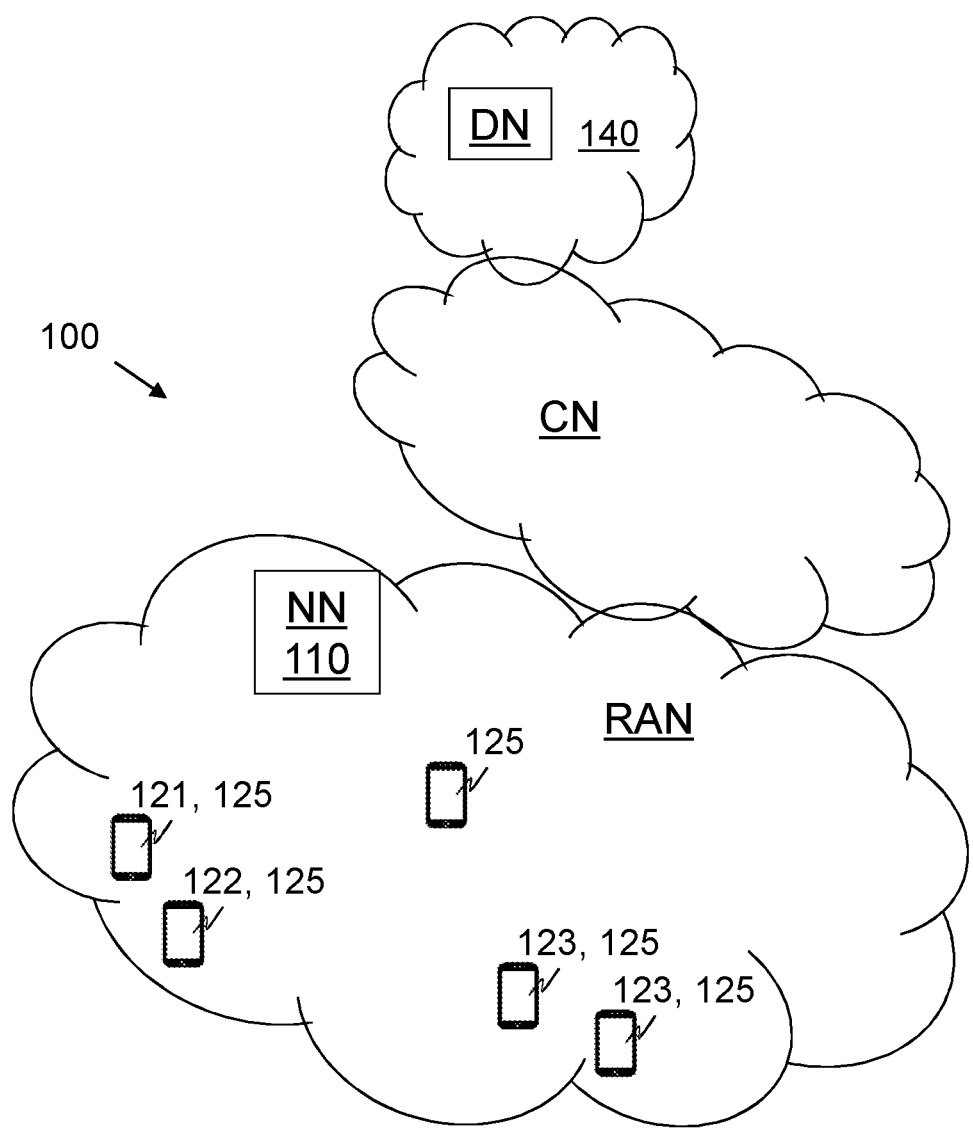
FIG. 2 is a schematic block diagram illustrating embodiments of a radio communications network.

FIG. 2 is a schematic overview depicting a radio communications network 100 wherein embodiments herein may be implemented. The radio communications network 100 comprises one or more RANs and one or more CNs. The radio communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Network nodes operate in the wireless communications network 100 such as a NN 110. The NN 110 may be a base station or a network node with access to base stations for serving a UE such as UEs 121, 122, 123, 125 as described below. The wording NN 110 thus covers a base station or a network node with base stations that it has access to. The NN 110 provides radio coverage over a geographical area, a service area referred to as a cell, which may also be referred to as a beam or a beam group of a first radio access technology (RAT), such as 5G, LTE, Wi-Fi or similar. The NN 110 may be a NR-RAN node, transmission and reception point e.g. a base station, a radio access node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a cellular UE or D2D UE 121, 122, 123, 125 within the service area served by the NN 110 depending e.g. on the first radio access technology and terminology used. The NN 110 may be referred to as radio nodes and may communicate with a D2D UE 121 with Downlink (DL) transmissions to the D2D UE 121 and Uplink (UL) transmissions from the D2D UE 121. The NN 110 is a serving node for the D2D UE 121.

A number of UEs operate in the wireless communication network 100, such as a first D2D UE 121, a second D2D UE 122, other D2D UEs 123, and cellular UEs 125. The UEs 121, 122, 123, 125 may each be any of a mobile station, a non-access point (non-AP) STA, a STA, a user equipment and/or a wireless terminals, that communicate via one or more Access Networks (AN), e.g. RAN, e.g. via the NN 110 to one or more core networks (CN). It should be understood by the skilled in the art that "UE" is a non-limiting term which means any terminal, wireless communication terminal, user equipment, Machine Type Communication (MTC) device, D2D UE, or node e.g. smart phone, laptop, mobile phone, sensor, relay, mobile tablets or even a small base station communicating within a cell. The first D2D UE 121, the second D2D UE 122, and the other D2D UEs 123, i.e.

the D2D UEs 121, 122, 123, are capable of communicating in SL operation with other D2D capable UEs in their neighbour. The D2D UEs 121, 122, 123, are further cellular UEs capable to access the RAN via a serving network node such as the NN 110. Any of the D2D UEs 121, 122, 123, may be a V2X device performing V2X communication. V2X communication includes any combination of direct communication between vehicles, pedestrians and infrastructure. Therefore, X in V2X may denote 'vehicular', also known as V2V, or X may denote 'pedestrian', also known as V2P, or X may denote 'infrastructure' also known as V2I, and so on. The embodiments described herein are applicable for any type of D2D operation including ProSe, V2X and so on.

Methods herein may in a first aspect be performed by the first D2D UE 121, and in a second, third and fourth aspect by the network nodes such as the NN 110. As an alternative, a Distributed Node (DN) and functionality, e.g. comprised in a cloud 140 as shown in FIG. 2, may be used for performing or partly performing the methods.

GP symbols normally used to account for UL propagation delay may instead, if available, be reused partly or fully for SL communication such as D2D e.g. between the first and second D2D UE 121, 122. For example, in LTE, a cellular network e.g. comprised in the radio communications network 100, already knows the special subframe configuration. In NR there are several slot formats, which comprise a large number of flexible symbols, which in turn may be configured as GP. In large cell size the GP within such switching time resource, e.g. subframe, slot, etc. may be quite large and such symbols are not used for any operation or communication. The NN 110 may determine a certain number (L) of GP symbols within the switching time resource as SL resources for D2D operation. The need for configuring GP symbols for SL operation and determining the parameter L are based on one or more criteria, e.g. type of SL signals to be transmitted by the D2D UEs 121, 122, e.g. critical or urgent signals, load of cellular UEs 125, load of D2D UEs 121, 122, 123, cell size, location of cellular and D2D UEs with respect to each other in a cell, etc. Moreover, the parameter L may also depend on the periodicity of SL signals which are to be transmitted over radio resources indicated by L, type of D2D/SL service, e.g. whether it is D2D discovery signal, D2D communication signal, unicast signals, multicast or broadcast signals. Whether the NN 110 configures L and its size may further depend on the current interference experienced by the first and second UE and NN 110 using the current TDD configuration.

The parameter L denoting the number of symbols for SL operation may vary over time, e.g. on semi-static basis, and therefore the first D2D UE 121 is configured or updated with the associated configuration. For example, the NN 110 may convey to the D2D UEs explicitly or implicitly in a time window, e.g. L symbols and their time location within the GP, when SL communication is allowed such that it does not cause interference to the detection of cellular UE transmissions. Furthermore, the UE behavior of applying SL operation in specific GP symbols also may require to be specified in the standard.

Embodiments herein will first be described in a more general way together with FIGS. 3 and 4. This will be followed by a more detailed description of the embodiments.

Figure 3:
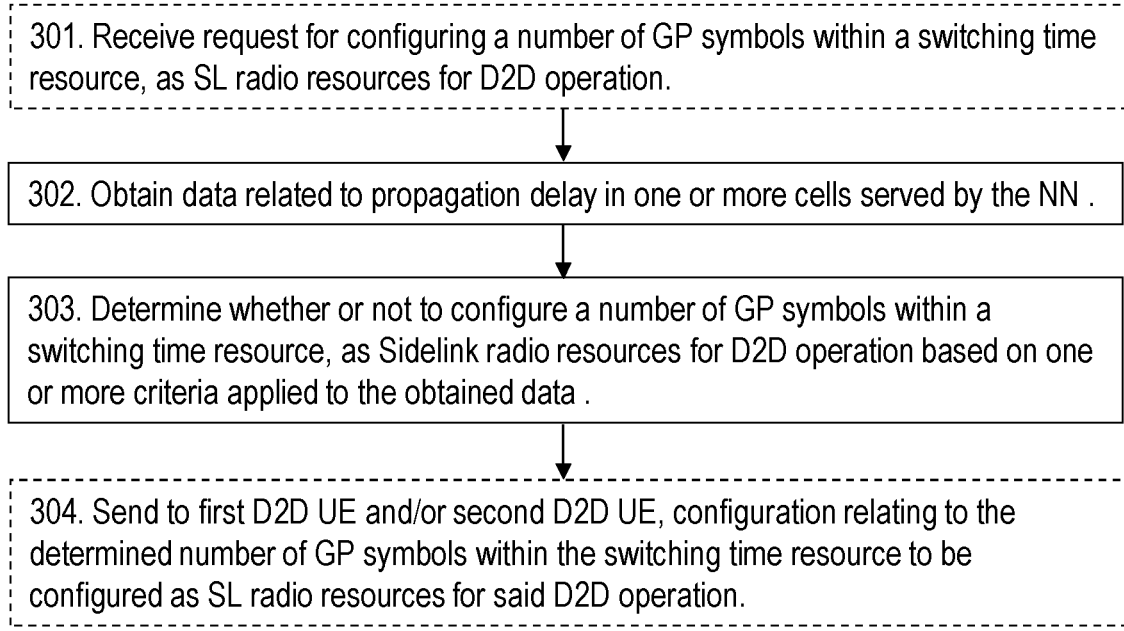
FIG. 3 is a flowchart depicting a method performed by a NN according to embodiments herein.

FIG. 3 shows an example method performed by the NN 110 for handling D2D operation between the first D2D UE 121 and the second D2D UE 122 in the radio communications network 100.

According to an example scenario the first D2D UE 121 and the second D2D UE 122 are about to start, or are having an ongoing communication over an SL radio resource between each other in the radio communications network 100. The first D2D UE 121 may be served by the NN 110. In order to improve the efficiency in the radio communications network 100, the NN 110 will start the process to see if any of GP symbols within a switching time resource are suitable for SL radio resources for D2D operation between the first D2D UE 121 and the second D2D UE 122.

The method comprises one or more of the following actions, which actions may be taken in any suitable order. Actions that are optional are marked with dashed boxes in the figure.

Action 301

In some embodiments, the NN 110 is triggered to start the process to see if any of GP symbols within a switching time resource are suitable for SL radio resources for D2D operation by receiving a request for it.

Thus, in these embodiments, the NN 110 may receive a request for configuring a number L of GP symbols within a switching time resource as SL radio resources for said D2D operation. The request may be received from any one out of: the first D2D UE 121 or a network node, e.g. from a third-node such as a ProSe server, or any nodes maintaining the D2D devices such as the first D2D UE 121. The request may further comprise the data related to the propagation delay which then is obtained as described in Action 302 below.

Action 302

In order to make an accurate determination on whether or not to configure a number of GP symbols within a switching time resource as SL radio resources for said D2D operation, the NN 110 need to take into consideration information about propagation delay in one or more cells that are served by the NN 110, so the NN 110 needs to take into account the current traffic in cells managed or served by NN 110.

The NN 110 thus obtains data related to propagation delay in the one or more cells served by the NN 110. The propagation delay is related to any one or more out of: the first D2D UE 121, the second D2D UE 122, other D2D UEs 123, and cellular UEs 121, 122, 123, 125.

The obtained data related to the propagation delay may be based on one or more out of:

Load of cellular second UEs in the one or more cells served by the NN 110,

Load of D2D UEs in the one or more cells served by the NN 110, and/or for SL operation in the one or more cells served by the NN 110, Location of D2D UEs in the one or more cells served by the NN 110, with respect to the location of cellular UEs, Whether the transmit power of D2D UEs for SL operation can be controlled or not, Periodicity of the SL signals which are capable to be transmitted over GP resources, Type of D2D signals to be transmitted, Interference experienced by any one or more out of: the NN 110, the first D2D UE 121 and the second D2D UE 122.

Action 303

The NN 110 then determines whether or not to configure a number of GP symbols within a switching time resource as SL radio resources for said D2D operation. The determining is based on one or more criteria applied to the obtained data related to the propagation delay. If determined to configure, the NN 110 further determines a certain number L of GP symbols within the switching time resource as SL resources for D2D operation. The need for configuring GP symbols for SL operation and determining the parameter L are based on the one or more criteria, e.g. type of SL signals to be transmitted by D2D UEs e.g. critical or urgent signals, load of cellular UEs, load of D2D UEs, cell size, location of cellular and D2D UEs with respect to each other in a cell, etc. This may be in form of a threshold value for the respective criteria, by comparing the obtained data related to the propagation delay with the respective threshold value. This will be described and exemplified below.

The switching time resource may be comprised in one or more frames relating to any half duplex (HD) system. Examples of HD are TDD and Half Duplex Frequency Division Duplexing, (HD-FDD).

Action 304

In an example scenario, the NN 110 has determined to configure a number of GP symbols within the switching time resource as SL radio resources for the D2D operation. The NN 110 may then send a configuration to respective any one or more out of the first D2D UE 121 and the second D2D UE 122. The configuration relates to the determined number of GP symbols within the switching time resource to be configured as SL radio resources for said D2D operation.

The configuration may indicate a time period, during which, the determined number of GP symbols within the switching time resource is to be configured as SL radio resources for said D2D operation. This is because in one example the SL operation is expected to be performed over certain time period. In yet another example the NN 110 may have to reevaluate after certain time period the number of GP symbols which are available within the switching time resource. For example this may depend on the traffic load of the cellular UEs in the cell and/or their location in the cell.

The configuration may further indicate which one or more parts of the switching time resource the determined number of GP symbols is to be configured as SL radio resources for said D2D operation. This to inform the first D2D UE 121 where in the switching time resource the determined number of GP symbols is to be configured.

Figure 4:
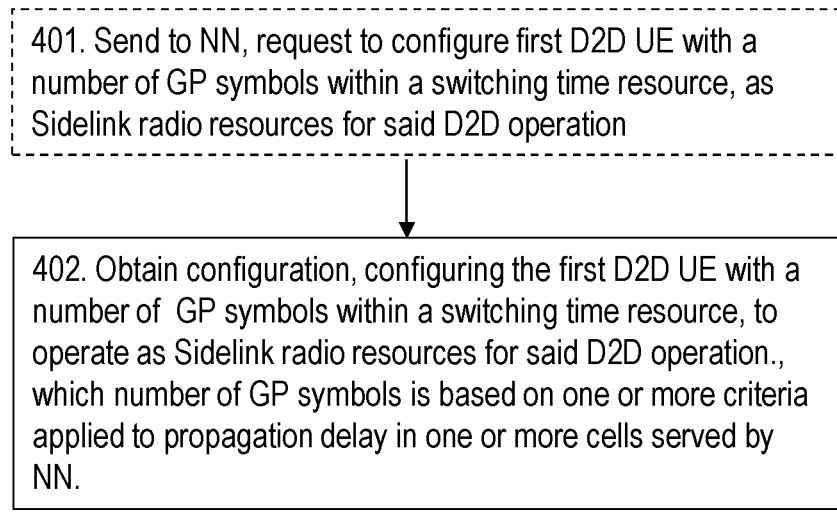
FIG. 4 is a flowchart depicting a method performed by a first D2D UE according to embodiments herein.

FIG. 4 shows an example method performed by the first D2D UE 121 for handling D2D operation between the first D2D UE 121 and the second D2D UE 122 in the radio communications network 100. The first D2D UE 121 is served by a Network Node NN 110.

Referring again to the example scenario described above, wherein the first D2D UE 121 and the second D2D UE 122 are about to start, or are having an ongoing communication over an SL radio resource between each other in the radio communications network 100. In order to improve the efficiency in the radio communications network 100, the NN 110 will start the process to see if any of GP symbols within a switching time resource are suitable for SL radio resources for D2D operation between the first D2D UE 121 and the second D2D UE 122.

The method comprises one or more of the following actions, which actions may be taken in any suitable order. Actions that are optional are marked with dashed boxes in the figure.

Action 401

In some embodiments, the NN 110 may be triggered to start the process to see if any of GP symbols within a switching time resource are suitable for SL radio resources for D2D operation by the first D2D UE 121 sending a request to the NN 110. The request requests the NN 110 to configure the first D2D UE 121 with a number of GP symbols within a switching time resource as SL radio resources for a D2D operation. The switching time resource may be comprised in one or more frames e.g. relating to TDD or HD-FDD.

The request may comprise data related to the propagation delay. The data related to the propagation delay may be used by the NN 110 for determining the number of GP symbols based on one or more criteria applied to the propagation delay see Action 303 above.

Action 402

As seen in Action 303 above, the NN 110 has determined whether or not to configure a number of GP symbols within a switching time resource as SL radio resources for said D2D operation. The determining is based on one or more criteria applied to the obtained data related to the propagation delay. The configuration may then be sent to the first D2D UE 121 by the NN 110.

The D2D UE 121 obtains a configuration. The configuration may be obtained from the NN 110. In some embodiments, the configuration is obtained by being pre-defined in the first D2D UE 121. In some alternative embodiments, the configuration is obtained by being received from a node in a CN, e.g. Access and Mobility management Function (AMF), Mobility Management Entity (MME) etc. In yet another example the configuration may be obtained by pre-configuration e.g. by retrieving from the Subscriber Interface Module (SIM) card.

The configuration configures the first D2D UE 121 with a number of GP symbols within a switching time resource to operate as SL radio resources for said D2D operation. How this determined is described above under Action 303.

The number of GP symbols is based on one or more criteria applied to propagation delay in one or more cells served by the NN 110, and which propagation delay is related to any one or more out of: the first D2D UE 121, the second D2D UE 122, other D2D UEs 123, and cellular UEs 121, 122, 123, 125.

The configuration may indicates any one or more out of: a time period, during which, the determined number of GP symbols within the switching time resource is to be configured as SL radio resources for said D2D operation, and/or which one or more parts of the switching time resource the determined number of GP symbols is to be configured as SL radio resources for said D2D operation.

The propagation delay may be based on one or more out of:
Load of cellular second UEs in the one or more cells served by the NN 110,
Load of D2D UEs in the one or more cells served by the NN 110, and/or for SL operation in the one or more cells served by the NN 110,
Location of D2D UEs in the one or more cells served by the NN 110, with respect to the location of cellular UEs,
Whether the transmit power of D2D UEs for SL operation can be controlled or not,
Periodicity of the SL signals which are capable to be transmitted over GP resources,
Type of D2D signals to be transmitted,
Interference experienced by any one or more out of: the NN 110, the first D2D UE 121 and the second D2D UE 122.

The embodiments above will now be further explained and exemplified. The example of embodiments below may be combined with any suitable embodiments described above.

As mentioned above, the special subframe is the subframe wherein the DL-to-UL switching occurs. In LTE, the special subframe configuration may be determined by the NN 110 and therefore already known. In NR typically one slot contains either DL or UL symbols. However, the same slot may also contain both DL and UL symbols. In the latter case DL and UL symbols are separated by one or more symbols for GP. Therefore, slots used for switching between DL and UL slots, or any slot containing DL and UL symbols and GP symbols are also known to the NN 110. For simplicity and consistency such slots in NR containing both DL and UL symbols separated by one or more GP symbols or special subframe in LTE are termed herein as switching time resource. The number of GP symbols depends on the deployment scenario, e.g. cell size of a cell served or managed by the NN 110. For example, the LTE special subframe configuration #0, which is used in large cell comprises up to 10 GP symbols. Similarly, in NR slot format #19 and format #22 may be used in large cells by configuring up to 12, 11 and 10 GP symbols, respectively.

According to one aspect of an embodiment when a switching time resource configured by the NN 110 in a cell comprises at least K number of GP symbols, then at least L number of GP symbols are configured for SL operation where L s K. In one example K=4 symbols. In one example K=6 or 8 symbols. In one specific example L<K. As special case $L=\lfloor LK/n \rfloor$, where as an example n=2. For example if K=9 and n=2 then L=4 symbols.

According to another aspect of the embodiment the symbols L used for the SL operation may be configured in specific part(s) of the GP. To explain this, consider an example assuming that the switching time resource contains M symbols with symbol numbers represented by the following expression:

$$\{S_1, \ldots, S_i, S_{i+1}, \ldots, S_{i+K}, S_{i+K+1}, \ldots, S_{i+K+j}\}, \quad (1)$$

where:

The first 'i' symbols ($S_1, \ldots, S_i$) represent DL symbols,
The next 'K' symbols ($S_{i+1}, \ldots, S_{i+K}$) represent GP symbols, and
The last 'j' symbols ($S_{i+K+1}, \ldots, S_{i+K+j}$) represent UL symbols.

As special case M=14, e.g. for normal CP length, and M=12, e.g. for extended CP length.

In the above example, according to the embodiment, in one example the L symbols for SL operation belong to the set of any of the GP symbols. In another example the L symbols for SL operation may be any of set of consecutive symbols within the set of the GP symbols. In yet another example the L symbols for SL operation may be a set of symbols configured in the latter part of the GP closer to the UL symbols, e.g. symbols #($S_{i+(K-L)}, \ldots, S_{i+K}$) may be configured for SL operation.

In the above examples the decision, i.e. the determination, made by the NN 110, of whether or not to configure L symbols for the SL operation, value of parameters such as L, the location of SL symbols etc., may be determined by one or more criteria. Examples of such criteria may be, e.g. threshold values related to, respective one or more out of:

Load of cellular UEs 125 in a cell, e.g. number of cellular UEs in a cell.
Location of cellular UEs 125 in a cell, e.g. whether they are closer to the NN 110 or far from the NN 110.
Load of the D2D UEs 121, 122, 123, in a cell, e.g. number of D2D UEs 121, 122, 123, for SL operation.
Location of the D2D UEs 121, 122, 123, in a cell, e.g. whether they are closer to the NN 110 or far from the NN 110,
Location of the D2D UEs 121, 122, 123, with respect to the location of cellular UEs 125,
Whether the transmit power of the D2D UEs 121, 122, 123, for SL operation may be controlled or not, e.g. power control is possible in case of unicast operation of D2D,
Specific purpose e.g. to enable transmission of specific D2D signals or messages. The signals or messages may be associated with criticality, e.g. important reference signal, messages related to safety application in V2X or public safety, etc.
Periodicity of the SL signals which may be transmitted over the GP resources.
Type of signals and/or channels, e.g. D2D discovery or D2D communication signals.
Interference situations as experienced by the network node and/or UEs 121, 122, 123, 125.

In one example, the NN 110 may reconfigure from the one slot format, e.g. TDD format, to another slot format based on the information listed above. For example, if the new slot format allows the NN 110 to utilize more resources of the GP for SL, it may reconfigure it to that SL format. For example, when the load of the cellular UEs 125 in the cell is below certain threshold (H1) and/or when the load of the D2D UEs 121, 122, 123 is above certain threshold (G1) then the NN 110 may decide to configure the L symbols in the GP for the SL operation; otherwise it may not configure any symbol in the GP for the SL operation.

The determining of the parameter L depends on one or more factors, e.g. location of the cellular UEs 125 and/or D2D UEs 121, 122, 123, the load of cellular UEs and/or D2D UEs 121, 122, 123, transmit power of cellular UEs 125 and/or D2D UEs 121, 122, 123, etc. One or more factors impacting L may vary over time due to e.g. arrival of new cellular UEs 125 and/or D2D UEs 121, 122, 123, termination of existing cellular UEs 125 and/or D2D UEs 121, 122, 123, movement of cellular UEs 125 and/or D2D UEs 121, 122, 123 within the cell, etc. Therefore, it is beneficial to have the possibility to configure the value of L to enable the network node to adapt L over time.

In another example when the load of the cellular UEs 125 in the cell is below certain threshold (H2) and/or when the load of the D2D UEs 121, 122, 123, is above certain threshold (G2) then the NN 110 may decide to configure the L symbols in the GP for the SL operation where L is above certain threshold (P1); otherwise it may either not configure any symbol in the GP for the SL operation or it may configure the L symbols in the GP for the SL operation where L≤P1.

In yet another example if the cellular UEs 125 and D2D UEs 121, 122, 123, are separated by at least certain distance, then the NN 110 may decide to configure the L symbols in the GP for the SL operation; otherwise it may either not configure any symbol in the GP for the SL operation or it may configure fewer L symbols in the GP for the SL operation equal to or below certain threshold (P2) e.g. L≤P2.

In yet another example if the transmit power of D2D UEs 121, 122, 123, may be controlled to reduce interference, then the NN may configure L symbols in the GP for the SL operation; otherwise it may either not configure any symbol in the GP for the SL operation or it may configure fewer L symbols in the GP for the SL operation equal to or below certain threshold (P3) e.g. L≤P3. The D2D UE's transmit power control enables the first D2D UE 121 to transmit using power which is optimal for reception of its signals at both the NN 110, e.g. on a cellular link, and at the other D2D UE 122, 123, reducing overall interference. The reduction in the interference also improves the reception of cellular UEs' signals at the NN 110.

In yet another example the NN 110 may decide to configure the L symbols in the GP for the SL operation for specific purpose e.g. for enabling the first D2D UE 121 and e.g. the second D2D UE 122 to transmit certain type of reference signals, e.g. SL Synchronization Signals (SLSS), for urgent signals to acquire or enable synchronization with respect to other D2D UEs 123, etc.

In yet another example, the NN 110 may decide to configure L based on type of D2D service to be transmitted over L. Examples of such services are D2D discovery, D2D communication, V2P, V2V, V2I, etc. For example, D2D discovery signals may be considered to less critical than D2D communication, V2V, etc. In this case, the netw NN 110 may configure to transmit D2D discovery signals over the resources indicated by L. As a specific example, D2D discovery signals may comprise advertisements, presence information which are broadcast to all UEs, such as the first D2D UE 121, in its vicinity. In embodiments where the D2D communication is represented by V2V communication, the signals may be used for a certain purpose, e.g. exchanging critical information related to the vehicle. In this case, discovery signals may be considered less important and may therefore be transmitted over the resources indicated by L on an best-effort basis. In addition, each service may be associated with a certain priority, so called ProSe per packet priority (PPPP), known at higher layer, and the NN 110 may select the type of services to operated, i.e. transmitted and/or received, over the resources indicated by L based on PPPP.

In yet another example, the NN 110 may decide to configure and transmit repetitions, of originals symbols and/or channels already transmitted in its designated radio resources, over the resources indicated by L. Examples of such repetitions are blind transmission of Hybrid Automatic Repeat Request (HARQ) feedback, blind transmission of reference signals such as SLSS. The NN 110 may also indicate whether or not repetitions are transmitted over the resources indicated by L and their type. In a similar example, the type of signals to be transmitted over the L symbols may also depend on the periodicity of such signals. In one example, if SLSS are already transmitted frequently using a short periodicity then the gain of transmitting repetitions of such signals over L symbols may not be significant. In this case, the network node may instead transmit HARQ feedback over the L symbols. On the other hand, if SLSS are transmitted less frequently with large periodicity, then the NN 110 may configure to transmit SLSS over the L symbols instead since it may provide significant value to the receiving node.

In yet another example, the NN 110 may decide to configure L based on interference experienced by the UE, such as the first D2D UE 121 and/or NN such as the NN 110. Such information may be obtained by the NN 110 from its own measurements or decoding and/or reception statistics or may be determined from the reported measurements from the UE such as the first D2D UE 121. If interference level is determined to be high, then the NN 110 may choose to not configure and transmit SL over L symbols. Otherwise, it may configure and transmit SL over L symbols.

A D2D UE 121, 122, 123, such as the first D2D UE 121 may have both SL (PC5) and cellular link (Uu) with respect to the serving BS. The direct communication between vehicle and other devices (V2V, V2I) uses so-called PC5 interface. PC5 refers to a reference point where a UE directly communicates with another UE over the direct channel.

In yet another example when the NN 110 configures the L symbols in the GP for the SL operation, it may ensure that the same D2D UE, such as the first D2D UE 121, using the L symbols is not scheduled for cellular communication with respect to the serving BS such as the NN 110, at least up to X1 number of slots before the switching time resource and up to X2 number of slots after the switching time resource, e.g. X1=X2=1 slot. This to make sure that the D2D does not cause any interruption to any of the L symbols due to switching between slot used for cellular communication and the L symbols used for the SL operation.

The D2D UEs such as the first D2D UE 121, may need to be configured with the information associated with the configured set of L symbols in the GP for the SL operation. In one example the configuration of the L symbols in the GP for the SL operation may be pre-defined e.g. associated with one or more NR slot formats. In another example the information about the configuration of the L symbols in the GP for the SL operation may be transmitted by the NN 110 to the first D2D UE 121, e.g. via higher layer signaling such as via RRC message in one or more system information block (SIB) and/or in a UE specific channel.

In one some embodiments, the NN 110 determines L and configures it to the first D2D UE 121 based on UE request or request originating from a third-node, e.g. ProSe server, or any nodes maintaining the D2D devices. The said request may also include additional information such as recommended values of L, recommended type of signals to transmit over L and information about transmission parameters including, e.g. recommended transmit power. In one further related example, the NN 110 may reconfigure from one slot format to another slot format based on recommended information form the UE such as the first D2D UE 121. The NN 110 may also reconfigure from one slot format to another in response to a received request from the UE such as the first D2D UE 121, a network node, or a third party node such as ProSe server.

Figure 5:
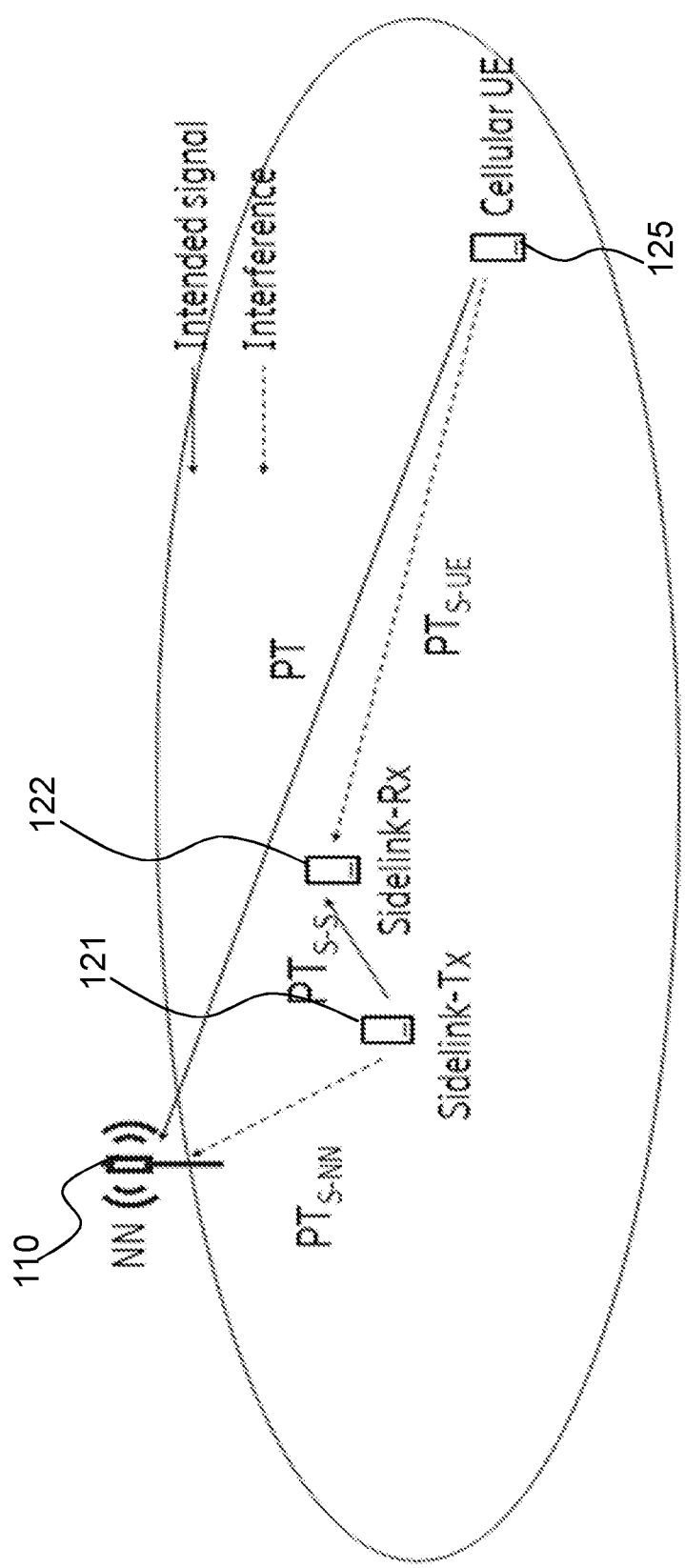
FIG. 5 is a schematic block diagram illustrating embodiments of a radio communications network.
Figure 6:
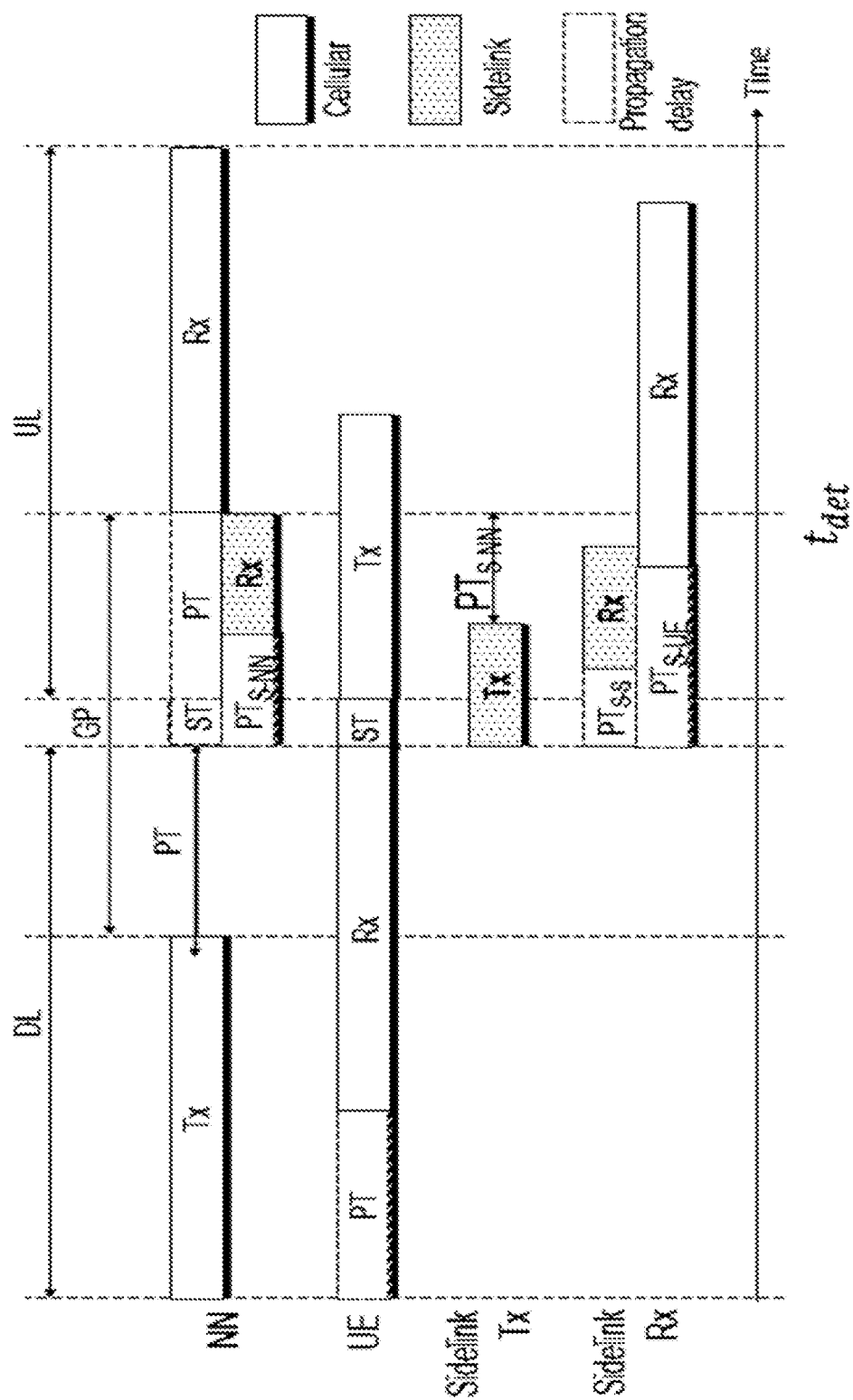
FIG. 6 is a schematic block diagram illustrating embodiments of a radio communications network.

The signals transmitted by the D2D UEs 121, 122, such as the first D2D UE 121 on the SL herein, may be called as SL messages. The SL messages sent by the D2D UEs 121, 122, such as the first D2D UE 121, e.g. by first D2D UE 121 on Sidelink-Tx, in any of the L symbols will be received not only by the intended second D2D UE 122, e.g. on Sidelink-Rx, but also by the NN 110. See FIG. 5 depicting deployment of cellular and SL nodes in single cell and FIG. 6 depicting a timeline of cellular and D2D transmission and reception on SL. Therefore, for the D2D UEs' 121, 122, such as the first D2D UE 121 operation on the SL on L symbols not to cause interference to the detection of cellular UE transmissions, the D2D UEs' transmitted SL messages must arrive at the NN before the start of $t_{det}$, $t_{det}$ is defined above in FIG. 1. This means that the D2D UE (e.g. UE1 on Sidelink-Tx) should not transmit later than $t_{det}-PT_{S-NN}$, where $PT_{S-NN}$ is the propagation delay between the transmitting SL node and the NN 110. To facilitate this, knowledge about the propagation delay not just with respect to the cellular UEs 125 but also with respect to D2D UEs' 121, 122, 123, transmitting on the SL is needed from the cellular network point of view. To better describe embodiments herein, the deployment and corresponding timeline of transmission and reception is illustrated for the simplified single cell scenario in FIG. 5 and FIG. 6, respectively, though embodiments herein are not limited to this specific scenario.

Since the GP grows with the propagation delay, so will the number of GP symbols that may potentially be reused for SL communication. However, depending on the locations of and distances between receiving D2D UE such as the second D2D UE 122, on the SL and transmitting cellular UEs 125, the D2D UEs, such as the first D2D UE 121 and the second D2D UE 122, on SL may experience interference from transmitting cellular UEs 125. As described in earlier examples, based on the cellular UEs 125 and/or D2D UEs 121, 122, 123, load and/or their location with respect to each other, the NN 110 may avoid or minimize the impact of interference by adapting the parameters such as L symbols, their location within GP etc.

The focus on reusing the part of the GP related to UL propagation delay is motivated as follows. To begin with, the premise for reusing the GP symbols in the first place is that the propagation delay is long enough which corresponds to a large cell size. In such scenarios the NN 110 transmission power is often much stronger than that of D2D UEs such as the first D2D UE 121 and the second D2D UE 122, transmitting on the SL, making the reuse of the GP related to DL propagation delay less attractive due to the risk of getting hit by very strong interference from NNs, such as e.g. the NN 110. Therefore, focus is on the GP related to UL propagation delay.

Figure 7A:
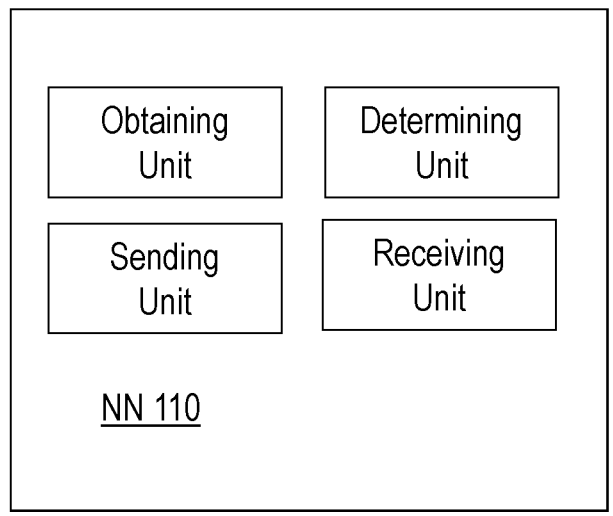
FIGS. 7 *a* and *b* are a schematic block diagram illustrating embodiments of a NN.
Figure 7B:
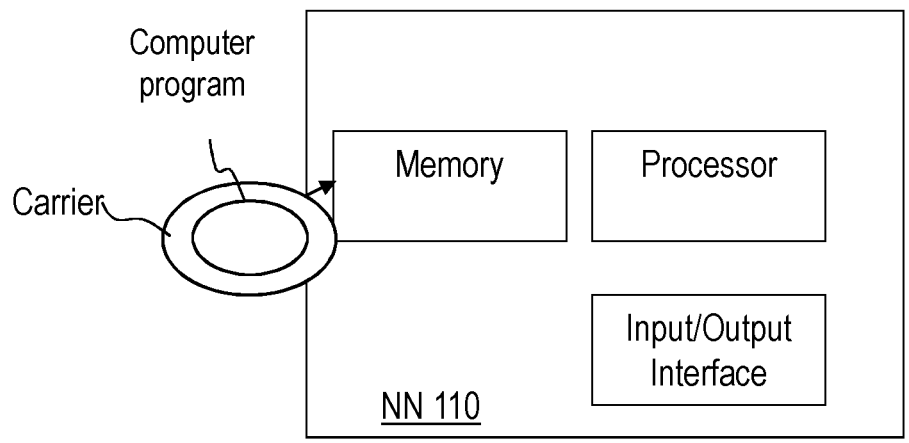

To perform the method actions described above, the NN 110 may comprise an arrangement as shown in FIGS. 7a and 7b.

The NN 110 may comprise an input and output interface configured to communicate with each other, see FIG. 7b. The input and output interface may comprise a wireless receiver (not shown) and a wireless transmitter (not shown).

As seen in FIG. 7a, the NN 110 may comprise an obtaining unit, a determining unit, a sending unit, and a receiving unit.

The NN 110 is configured to handling D2D operation between the first D2D UE 121 and the second D2D UE 122 in a radio communications network 100.

The NN 110 is further configured to, e.g. by means of the obtaining unit, comprised in the NN 110, obtain data related to propagation delay in one or more cells served by the NN 110. The propagation delay is adapted to be related to any one or more out of: the first D2D UE 121, the second D2D UE 122, other D2D UEs 123, and cellular UEs 121, 122, 123, 125.

The data related to the propagation delay to be obtained may be adapted to be based on one or more out of:
Load of cellular second UEs in the one or more cells served by the NN 110,
Load of D2D UEs in the one or more cells served by the NN 110, and/or for SL operation in the one or more cells served by the NN 110,
Location of D2D UEs in the one or more cells served by the NN 110, with respect to the location of cellular UEs,
Whether the transmit power of D2D UEs for SL operation can be controlled or not,
Periodicity of the SL signals which are capable to be transmitted over GP resources,
Type of D2D signals to be transmitted,
Interference experienced by any one or more out of: the NN 110, the first D2D UE 121 and the second D2D UE 122.

The NN 110 is further configured to, e.g. by means of the determining unit, comprised in the NN 110, determine whether or not to configure a number of GP symbols within a switching time resource, as SL radio resources for said D2D operation. The determining is adapted to be based on one or more criteria applied to the obtained data related to the propagation delay.

In an example scenario according to some embodiments herein, it is to be determined to configure a number of GP symbols within the switching time resource as SL radio resources for the D2D operation.

In these embodiments, the NN 110 may further be configured to, e.g. by means of the sending unit, comprised in the NN 110, send a configuration to respective any one or more out of: the first D2D UE 121 and the second D2D UE 122. The configuration is adapted to relate to the determined number of GP symbols within the switching time resource to be configured as SL radio resources for said D2D operation.

The configuration may further be adapted to indicate any one or more out of: A time period, during which, the determined number of GP symbols within the switching time resource is to be configured as SL radio resources for said D2D operation, and which one or more parts of the switching time resource the determined number of GP symbols is to be configured as SL radio resources for said D2D operation.

In some embodiments, the NN 110 may further be configured to, e.g. by means of the receiving unit, receive a request for configuring a number of GP symbols within a switching time resource, as SL radio resources for said D2D operation. The request is to be received from any one out of: the first D2D UE 121 or a network node.

The request may be adapted to comprise the obtained data related to the propagation delay.

Figure 8A:
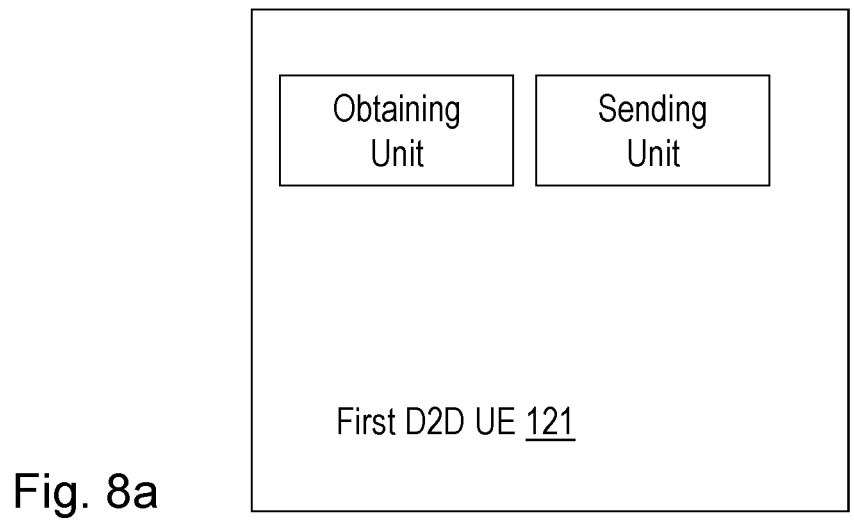
FIGS. 8 *a* and *b* are a schematic block diagram illustrating embodiments of a first D2D UE.
Figure 8B:
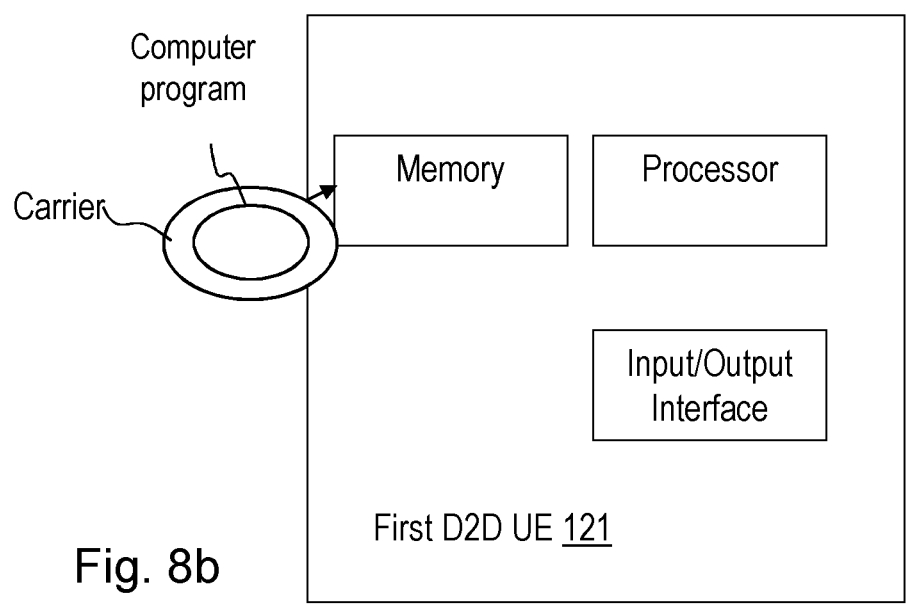

To perform the method actions described above, the first D2D UE 121 may comprise an arrangement as shown in FIGS. 8a and 8b.

The first D2D UE 121 may comprise an input and output interface configured to communicate with each other, see FIG. 8b. The input and output interface may comprise a wireless receiver (not shown) and a wireless transmitter (not shown).

As seen in FIG. 8a, the first D2D UE 121 may comprise a sending unit, and an obtaining unit.

The first D2D UE 121 is configured to handling D2D operation between the first D2D UE 121 and the second D2D UE 122 in a radio communications network 100. The first D2D UE 121 is served by the NN 110.

The first D2D UE 121 is further configured to, e.g. by means of the obtaining unit, comprised in the first D2D UE 121, obtain a configuration. The configuration is adapted to configure the first D2D UE 121 with a number of GP symbols within a switching time resource to operate as SL radio resources for said D2D operation. The number of GP symbols is adapted to be based on one or more criteria applied to propagation delay in one or more cells served by the NN 110. The propagation delay is adapted to be related to any one or more out of: the first D2D UE 121, the second D2D UE 122, other D2D UEs 123, and cellular UEs 121, 122, 123, 125.

The configuration may be obtained from the NN 110.

The configuration may further be adapted to indicate any one or more out of: A time period, during which, the determined number of GP symbols within the switching time resource is to be configured as SL radio resources for said D2D operation, or which one or more parts of the switching time resource the determined number of GP symbols is to be configured as SL radio resources for said D2D operation.

The propagation delay may be adapted to be based on one or more out of:
Load of cellular second UEs in the one or more cells served by the NN 110,
Load of D2D UEs in the one or more cells served by the NN 110, and/or for SL operation in the one or more cells served by the NN 110,
Location of D2D UEs in the one or more cells served by the NN 110, with respect to the location of cellular UEs, Whether the transmit power of D2D UEs for SL operation can be controlled or not, Periodicity of the SL signals which are capable to be transmitted over GP resources, Type of D2D signals to be transmitted, and Interference experienced by any one or more out of: the NN 110, the first D2D UE 121 and the second D2D UE 122.

The first D2D UE 121 may further be configured to, e.g. by means of the sending unit comprised in the first D2D UE 121, send a request to the NN 110. The request may be adapted to request to configure the first D2D UE 121 with a number of GP symbols within a switching time resource as SL radio resources for said D2D operation.

The request may further comprise data related to the propagation delay.

The embodiments herein may be implemented through a respective processor or one or more processors, such as the processor of a processing circuitry in the respective NN 110 and first D2D UE 121 depicted in respective FIG. 7*b* and FIG. 8*b*, together with computer program code for performing the functions and actions of the embodiments herein. The program code mentioned above may also be provided as a computer program product, for instance in the form of a data carrier carrying computer program code for performing the embodiments herein when being loaded into the respective NN 110 and first D2D UE 121. One such carrier may be in the form of a CD ROM disc. It is however feasible with other data carriers such as a memory stick. The computer program code may furthermore be provided as pure program code on a server and downloaded to the respective NN 110 and first D2D UE 121.

The NN 110 and first D2D UE 121 may further comprise a respective memory comprising one or more memory units. The memory comprises instructions executable by the processor in the NN 110 and first D2D UE 121. The memory is depicted in respective FIG. 7*b* and FIG. 8*b*. The respective memory is arranged to be used to store e.g., data related to propagation delay, information, data, configurations, and applications to perform the methods herein when being executed in the NN 110 and first D2D UE 121.

In some embodiments, a respective computer program comprises instructions, which when executed by the at least one processor, cause the at least one processor of the NN 110 and first D2D UE 121 to perform the actions above. The computer program is depicted in respective FIG. 7*b* and FIG. 8*b*.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium. The carrier is depicted in respective FIG. 7*b* and FIG. 8*b*.

Those skilled in the art will also appreciate that the units in the respective NN 110 and first D2D UE 121, described above may refer to a combination of analog and digital circuits, and/or one or more processors configured with software and/or firmware, e.g. stored in the respective NN 110 and first D2D UE 121, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 9:
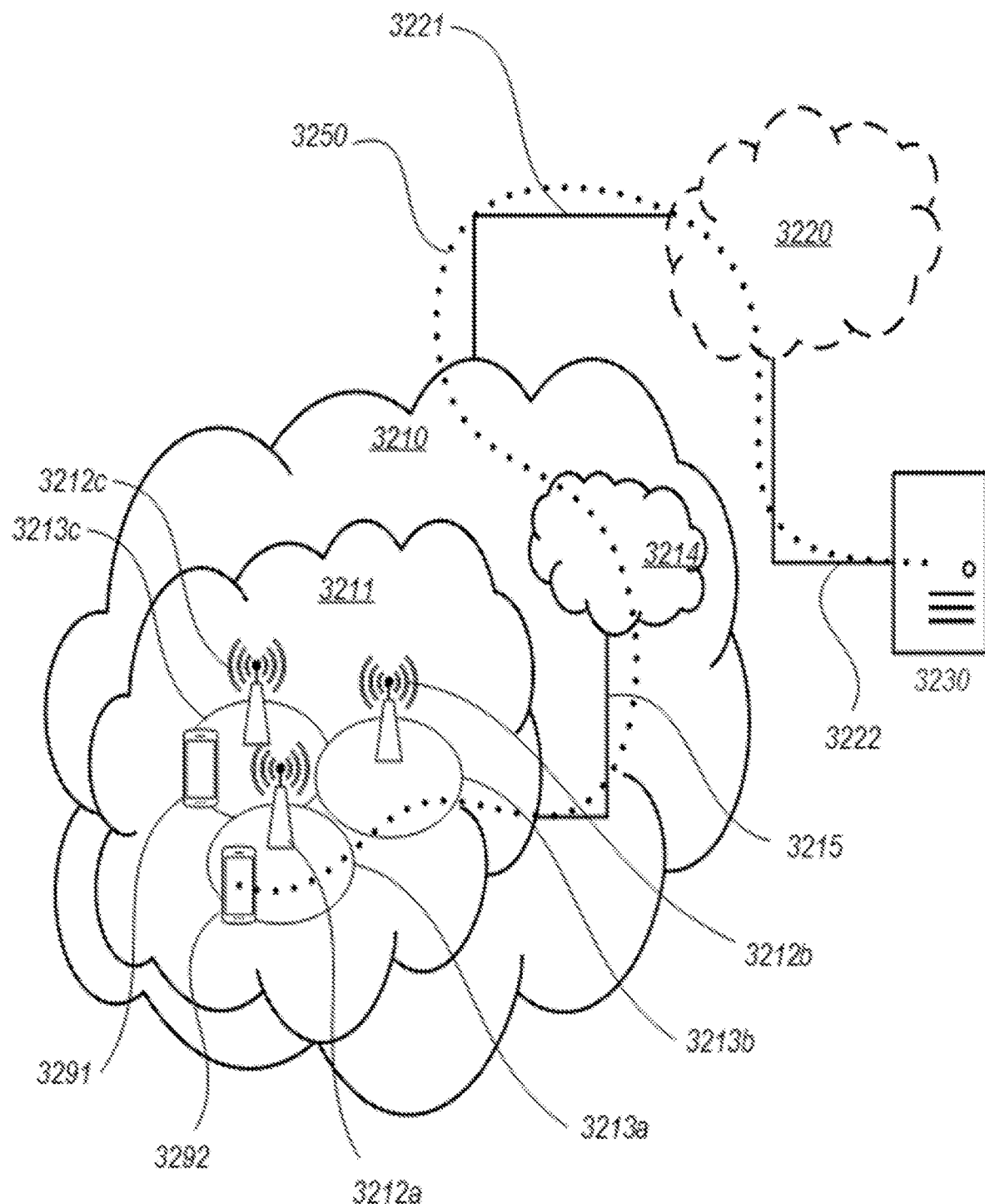
FIG. 9 schematically illustrates a telecommunication network connected via an intermediate network to a host computer.

With reference to FIG. 9, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as the NN110, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) such as the D2D UE 121, or a Non-AP STA 3291 located in coverage area 3213*c* is configured to wirelessly connect to, or be paged by, the corresponding base station 3212*c*. A second UE 3292 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 such as e.g. the UE 121, and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
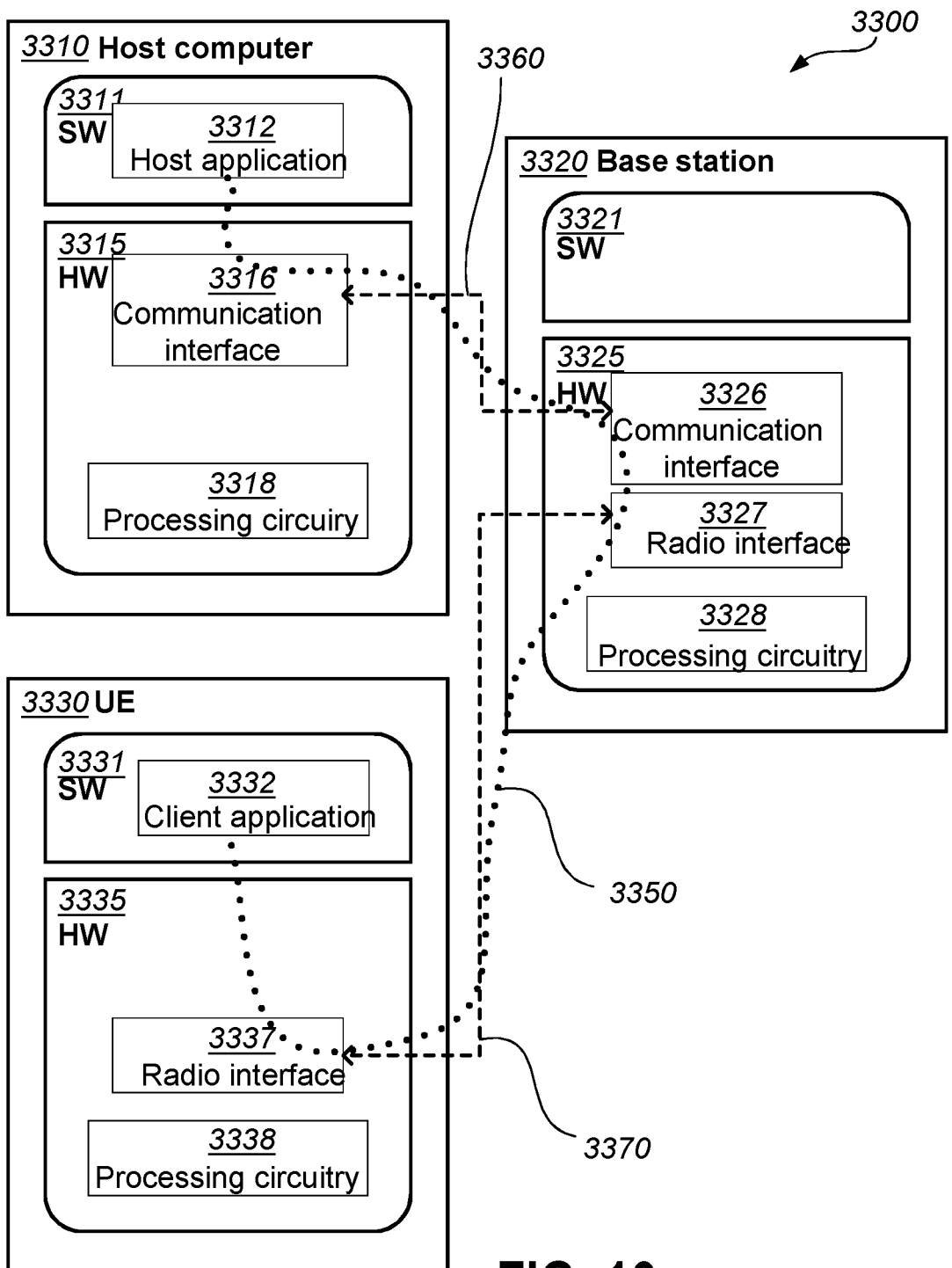
FIG. 10 is a generalized block diagram of a host computer communicating via a base station with a user equipment over a partially wireless connection.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. The expression "embodiments described throughout this disclosure" is meant to refer to the radio-related embodiments disclosed elsewhere in the application. One or more of the various embodiments improve the performance of OTT services provided to the UE 3330 using the OTT connection 3350, in which the wireless connection 3370 forms the last segment. More precisely, the teachings of these embodiments may e.g. improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 11 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 13 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 14 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviation | Explanation |
| --- | --- |
| D2D | Device-to-Device |
| DL | Downlink |
| GP | Guard Period |
| LTE | Long-Term Evolution |
| NN | Network Node |
| NR | New Radio |
| OFDMA | Orthogonal Frequency Division Multiple Access |
| Rx | Reception |
| SL | Sidelink |
| TDD | Time-division duplex |
| Tx | Transmission |
| UE | User Equipment |
| UL | Uplink |
| 5GC | 5G Core Network |

The invention claimed is:

1. A method performed by a Network Node, NN, for handling Device to Device, D2D, operation between a first D2D User Equipment, UE, and a second D2D UE in a radio communications network, the method comprising:
obtaining data related to propagation delay in one or more cells served by the NN, which propagation delay is related to any one or more out of: the first D2D UE, the second D2D UE, other D2D UEs, and cellular UEs; and
determining to configure a number of Guard Period, GP, symbols within a switching time resource, as Sidelink, SL, radio resources for the D2D operation, the determining being based on one or more criteria applied to the obtained data related to the propagation delay, the one or more criteria comprising a threshold value related to any one or more of:
a load of cellular UEs in a cell;
a location of cellular UEs in a cell;
a load of the D2D UEs in a cell;
a location of the D2D UEs in a cell;
whether transmit power of the D2D UEs for SL operation may be controlled;
whether signals or messages are associated with criticality;
a periodicity of SL signals that may be transmitted over the GP resources;
one or both of a type of signals and a type of channels;
interference situations as experienced by the network node and/or UEs; and
sending a configuration to respective any one or more out of the first D2D UE and the second D2D UE, which configuration relates to the determined number of GP symbols within the switching time resource to be configured as SL radio resources for the D2D operation, the configuration indicating a time period during which the determined number of GP symbols within the switching time resource is to be configured as SL radio resources for the D2D operation.

2. The method according to claim 1, wherein the configuration indicates:
which one or more parts of the switching time resource the determined number of GP symbols is to be configured as SL radio resources for the D2D operation.

3. The method according to claim 1, wherein the obtained data related to the propagation delay is based on one or more out of:
the load of cellular second UEs in the one or more cells served by the NN;
the load of D2D UEs in one or more of:
the one or more cells served by the NN; and for
SL operation in the one or more cells served by the NN;
the location of D2D UEs in the one or more cells served by the NN, with respect to the location of cellular UEs;
whether the transmit power of D2D UEs for SL operation can be controlled or not;
the periodicity of the SL signals which are capable to be transmitted over GP resources;
the type of D2D signals to be transmitted; and
the interference experienced by any one or more out of: the NN, the first D2D UE and the second D2D UE.

4. The method according to claim 1, further comprising:
receiving a request for configuring a number of GP symbols within a switching time resource, as SL radio resources for the D2D operation, which request is received from any one out of: the first D2D UE and a network node.

5. The method according to claim 1, wherein the request further comprises the obtained data related to the propagation delay.

6. The method according to claim 1, wherein the obtained data related to the propagation delay is based on one or more out of:
the load of cellular second UEs in the one or more cells served by the NN;
the load of D2D UEs in one or more of:
the one or more cells served by the NN; and for
SL operation in the one or more cells served by the NN;
the location of D2D UEs in the one or more cells served by the NN, with respect to the location of cellular UEs;
whether the transmit power of D2D UEs for SL operation can be controlled or not;
the periodicity of the SL signals which are capable to be transmitted over GP resources;
the type of D2D signals to be transmitted; and
the interference experienced by any one or more out of: the NN, the first D2D UE and the second D2D UE.

7. The method according to claim 1, further comprising:
receiving a request for configuring a number of GP symbols within a switching time resource, as SL radio resources for the D2D operation, which request is received from any one out of: the first D2D UE and a network node.

8. The method according to claim 1, wherein the request further comprises the obtained data related to the propagation delay.

9. A method performed by a first Device to Device, D2D, User Equipment, UE, for handling D2D operation between the first D2D UE and a second D2D UE in a radio communications network, which first D2D UE is served by a Network Node, NN, the method comprising:
obtaining a configuration, which configuration configures the first D2D UE with a number of Guard Period, GP, symbols within a switching time resource, to operate as Sidelink, SL, radio resources for the D2D operation, the configuration indicating a time period during which the number of GP symbols within the switching time resource is to be configured as SL radio resources for the D2D operation, the number of GP symbols being based on one or more criteria applied to propagation delay in one or more cells served by the NN, and the propagation delay being related to any one or more out of: the first D2D UE, the second D2D UE, other D2D UEs, and cellular UEs, the one or more criteria comprising a threshold value related to any one or more of:
a load of cellular UEs in a cell;
a location of cellular UEs in a cell;
a load of the D2D UEs in a cell;
a location of the D2D UEs in a cell;
whether transmit power of the D2D UEs for SL operation may be controlled;
whether signals or messages are associated with criticality;
a periodicity of SL signals that may be transmitted over the GP resources;
one or both of a type of signals and a type of channels; and
interference situations as experienced by the network node and/or UEs.

10. The method according to claim 9, wherein the configuration indicates:
which one or more parts of the switching time resource the determined number of GP symbols is to be configured as SL radio resources for the D2D operation.

11. The method according to claim 10, wherein the propagation delay is based on one or more out of:
the load of cellular second UEs in the one or more cells served by the NN;
the load of D2D UEs in one or more of:
the one or more cells served by the NN; and for
SL operation in the one or more cells served by the NN;
the location of D2D UEs in the one or more cells served by the NN, with respect to the location of cellular UEs;
whether the transmit power of D2D UEs for SL operation can be controlled or not;
the periodicity of the SL signals which are capable to be transmitted over GP resources;
the type of D2D signals to be transmitted; and
the interference experienced by any one or more out of: the NN, the first D2D UE and the second D2D UE.

12. The method according to claim 9, wherein the propagation delay is based on one or more out of:
the load of cellular second UEs in the one or more cells served by the NN;
the load of D2D UEs in one or more of:
the one or more cells served by the NN; and for
SL operation in the one or more cells served by the NN;
the location of D2D UEs in the one or more cells served by the NN, with respect to the location of cellular UEs;
whether the transmit power of D2D UEs for SL operation can be controlled or not;
the periodicity of the SL signals which are capable to be transmitted over GP resources;
the type of D2D signals to be transmitted; and
the interference experienced by any one or more out of: the NN, the first D2D UE and the second D2D UE.

13. The method according to claim 9, further comprising:
sending a request to the NN, which request requests to configure the first D2D UE with a number of GP symbols within a switching time resource, as SL radio resources for the D2D operation.

14. The method according to claim 13, wherein the request further comprises data related to the propagation delay.

15. The method according to claim 9, wherein the configuration is obtained from the NN.

16. A Network Node, NN, configured to handling Device to Device, D2D, operation between a first D2D User Equipment, UE, and a second D2D UE in a radio communications network, the NN further being configured to:
- obtain data related to propagation delay in one or more cells served by the NN, which propagation delay is adapted to be related to any one or more out of: the first D2D UE, the second D2D UE, other D2D UEs, and cellular UEs; and
- determine to configure a number of Guard Period, GP, symbols within a switching time resource, as Sidelink, SL, radio resources for the D2D operation, the determining being adapted to be based on one or more criteria applied to the obtained data related to the propagation delay, the one or more criteria comprising a threshold value related to any one or more of:
 a load of cellular UEs in a cell;
 a location of cellular UEs in a cell;
 a load of the D2D UEs in a cell;
 a location of the D2D UEs in a cell;
 whether transmit power of the D2D UEs for SL operation may be controlled;
 whether signals or messages are associated with criticality;
 a periodicity of SL signals that may be transmitted over the GP resources;
 one or both of a type of signals and a type of channels;
 interference situations as experienced by the network node and/or UEs; and
- sending a configuration to respective any one or more out of the first D2D UE and the second D2D UE, which configuration relates to the determined number of GP symbols within the switching time resource to be configured as SL radio resources for the D2D operation, the configuration indicating a time period during which the determined number of GP symbols within the switching time resource is to be configured as SL radio resources for the D2D operation.

17. A first Device to Device, D2D, User Equipment, UE, configured to handling D2D operation between the first D2D UE and a second D2D UE in a radio communications network, which first D2D UE is served by a Network Node, NN, the first D2D UE being configured to:
- obtain a configuration, which configuration is adapted to configure the first D2D UE with a number of Guard Period, GP, symbols within a switching time resource, to operate as Sidelink, SL, radio resources for the D2D operation, the configuration indicating a time period during which the number of GP symbols within the switching time resource is to be configured as SL radio resources for the D2D operation, the number of GP symbols being adapted to be based on one or more criteria applied to propagation delay in one or more cells served by the NN, and the propagation delay being adapted to be related to any one or more out of: the first D2D UE, the second D2D UE, other D2D UEs, and cellular UEs, the one or more criteria comprising a threshold value related to any one or more of:
 a load of cellular UEs in a cell;
 a location of cellular UEs in a cell;
 a load of the D2D UEs in a cell;
 a location of the D2D UEs in a cell;
 whether transmit power of the D2D UEs for SL operation may be controlled;
 whether signals or messages are associated with criticality;
 a periodicity of SL signals that may be transmitted over the GP resources;
 one or both of a type of signals and a type of channels; and
 interference situations as experienced by the network node and/or UEs.

18. The first D2D UE according to claim 17, wherein the configuration further is adapted to indicate:
 which one or more parts of the switching time resource the determined number of GP symbols is to be configured as SL radio resources for said D2D operation.

* * * * *